A. J. HALL & L. G. RILEY.
SYSTEM OF CONTROL.
APPLICATION FILED APR. 25, 1914.
1,231,598.
Patented July 3, 1917.
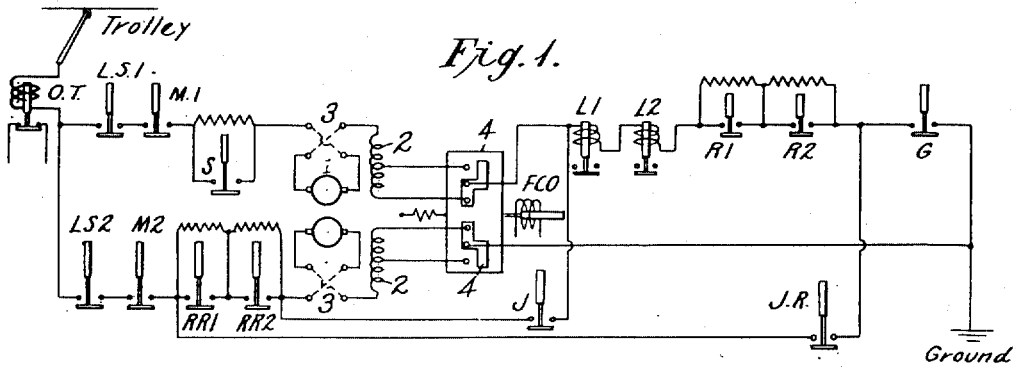
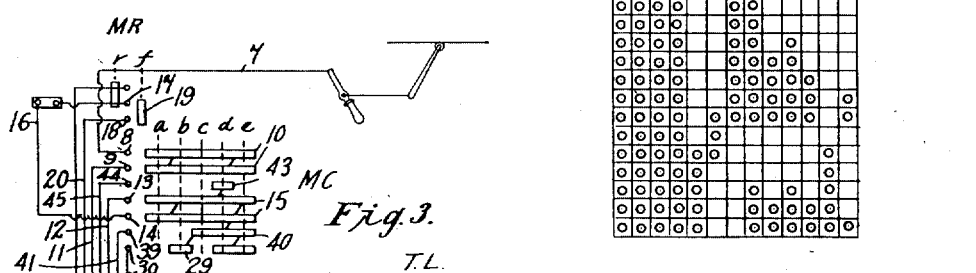
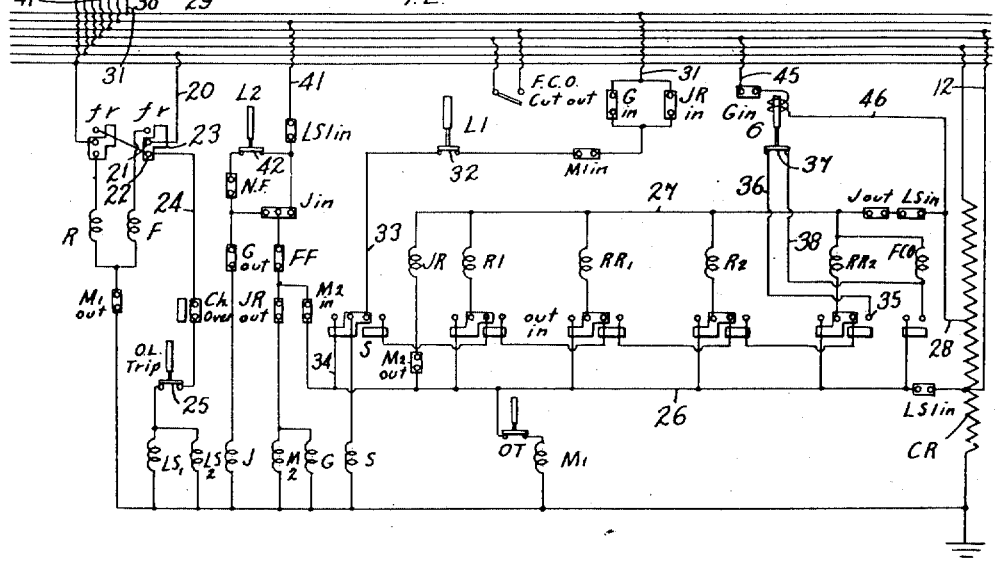
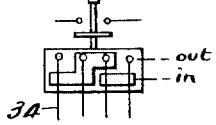
WITNESSES:
Fred H Miller
W. R. Coley
INVENTORS
Arthur J. Hall
Lynn G. Riley
BY
Wesley G. Carr
ATTORNEY

UNITED STATES PATENT OFFICE.

ARTHUR J. HALL AND LYNN G. RILEY, OF WILKINSBURG, PENNSYLVANIA, ASSIGNORS TO WESTINGHOUSE ELECTRIC AND MANUFACTURING COMPANY, A CORPORATION OF PENNSYLVANIA.

SYSTEM OF CONTROL.

1,231,598.  Specification of Letters Patent.  Patented July 3, 1917.

Application filed April 25, 1914. Serial No. 834,459.

*To all whom it may concern:*

Be it known that we, ARTHUR J. HALL, a subject of the King of Great Britain, and a resident of Wilkinsburg, in the county of Allegheny and State of Pennsylvania, and LYNN G. RILEY, a citizen of the United States, and a resident of Wilkinsburg, in the county of Allegheny and State of Pennsylvania, have invented a new and useful Improvement in Systems of Control, of which the following is a specification.

Our invention relates to systems of control, and it has special reference to means for controlling the operation of electric motors that are adapted for propelling electric railway vehicles and the like.

One object of our invention is to provide in a system of the above indicated character, means for insuring a smoother acceleration and greater efficiency of operation than has been heretofore attained.

More specifically stated, the object of our invention is to provide, in a series-parallel control system of the field-control type, means for preventing the initiation of the transition from series to parallel relation of the motors after the field-control switches have been operated, until a predetermined relatively low motor-current value has been reached.

Another object of our invention is to provide means for allowing the operation of the field change-over switch when the motors are in full series relation, but for preventing its operation, if desired, when the motors are in full parallel relation, a condition which is sometimes desirable in some classes of slow-speed service.

Heretofore, the transition of electric motors from series to parallel relation in a system of the above-indicated class has been begun as soon as the field change-over switch was operated, thereby preventing the full and smooth acceleration of the motors that would attain if the operation of the field change-over switches was allowed to have its full effect.

According to our invention, we provide means for operating the field change-over switch after the motors have attained their full series relation, and means, comprising a limit switch, for preventing the operation of the several transition switches until the current in the motor circuit has decreased to a predetermined value. In this way, the full accelerating effect of the change in field circuit current is secured to the motors, and a smoother acceleration and more efficient operation are thereby obtained.

We provide also a relay switch which is adapted to open the control circuit of the field change-over switch when the motors are in full parallel relation, if it is so desired.

In the accompanying drawings, Figure 1 is a diagrammatic view of a system of control embodying our invention, the main circuits only being shown. Fig. 2 is a chart of well-known form showing the sequence of operation of the various switches illustrated in Fig. 1, and Fig. 3 is a diagrammatic view of the auxiliary control system employed for operating the main system shown in Fig. 1. Fig. 4 is a view illustrating one of the motor-circuit switches.

Referring to the drawing, the system shown comprises a supply conductor marked "Trolley"; a return conductor marked "Ground"; a plurality of electric motors severally having armatures 1 and series field magnet windings 2, and severally provided with suitable reversing switches 3 and field change-over switches 4 of well-known form; a plurality of motor-operating switches LS1, M1, LS2, M2, J, JR and G; a plurality of accelerating resistors respectively adapted to be short circuited by switches S, R1, R2, RR1, and RR2; an overload trip switch marked OT; and a plurality of limit switches L1 and L2 of a familiar type.

Referring now to Fig. 3, the auxiliary control system shown comprises the supply conductors marked "Trolley" and "Ground"; a control resistor CR connected between the two supply conductors; a series of magnet coils of well-known construction severally adapted to actuate the switches shown in Fig. 1; a master controller MC for energizing the magnet coils in accordance with the chart shown in Fig. 2, and adapted to assume a plurality of motor operating positions *a* to *e*, inclusive, a master reverser MR that is electrically associated with the main reversing switches 3, in a well-known manner; and a plurality of interlocking contact members respectively designated by terms serving to show the switch with which each member is associated.

A suitable relay 6 is provided for opening the circuit of the field change-over magnet coil, designated as F. C. O., when energized, as hereinafter described; and a switch marked F. C. O. Cutout is adapted for employment in connection with the relay 6, under predetermined conditions. A plurality of train line conductors TL are preferably provided for use in multiple unit control of a plurality of railway vehicles (not shown).

The operation of the above-described control system may be set forth as follows: Assuming that the master reverser MR is moved to its forward position and that the master controller MC is moved to its first running position $a$, a control circuit is established from the trolley through a conductor 7, control fingers 8 and 9 of the master controller—which are bridged by a contact member 10—, a conductor 11 and the control resistor CR to "Ground". Another circuit is established from an intermediate point of the control resistor to conductor 12, control fingers 13 and 14—which are bridged by a contact member 15—conductor 16, control fingers 17 and 18—which are bridged by a contact member 19 of the master reverser—conductor 20, control fingers 21 and 22—which are bridged by a contact member 23 of the main reverser, in its forward position—conductor 24, interlock marked "Change-over", a contact member 25 of the overload trip switch O. T., and the coils of the switches LS1 and LS2 to the negative conductor, "Ground". A circuit is also established from the control resistor CR through an interlock marked LS1-in and conductor 26 to the coil of the switch M1, and also through an interlock marked M2-out, the coil of the switch JR, a conductor 27, interlocks marked, respectively, J-out and LS1-in, and conductor 28 to a second intermediate point in the control resistor. The switches LS1 and LS2, M1 and JR are thus closed, thereby connecting the motors 1 in series relation with all of the accelerating resistors, across the supply circuit.

When the master controller is moved to its second position $b$, an energizing contact member 29 engages a control finger 30, whence circuit is completed through conductor 31, interlocks marked, respectively, JR-in and M1-in, contact member 32 of the limit switch L1, when the motor current has decreased to a predetermined value, conductor 33 and the coil of the switch S to ground. The switch S is thus closed, whereupon a holding circuit therefor is established through conductors 34 and 26; and then the accelerating switches R1, RR1 R2 and RR2 are automatically and successively closed, dependent upon the limit switch L1, in a well-known manner which requires no further description.

When the RR2 switch is closed, a circuit is established from a contact finger 35 thereof through a conductor 36, contact member 37 of the relay switch 6, conductor 38, and the actuating coil of the field change-over switch 4 to the control resistor. The field change-over switch is thereby operated to exclude a predetermined amount of the field magnet windings of the electric motors from circuit, for a well-known purpose.

The position $c$ of the master controller is merely a transition position, serving to deenergize temporarily the control circuit that is connected to conductor 31 and energizes the control circuits for the transition switches, J, M2, and G. The transition is of the well-known "bridging" type, and is effected by means of the engagement of a control finger 39 with an energized contact segment 40 of the master controller, whence circuit is completed through a conductor 41, an interlock marked LS1-in, a movable contact member 42 of the limit switch L2, after the motor current, which is temporarily increased by the change in the field circuits has decreased to a value sufficient to allow the switch to drop, interlock marked NF, signifying normal field position of the field change-over switch, and an interlock marked G-out to the actuating coil of the switch J. As soon as the switch J is closed, the switches JR to F. C. O., inclusive, are opened by reason of the exclusion from their control circuits of the interlock J-out. When the field change-over switch 4 has returned to its full field position, the circuit of the magnet coil of the switch J is interrupted at the interlock NF, but is simultaneously made at an interlock marked J-in, from which a circuit is also established through an interlock marked FF, signifying full field position of the field change-over switch, an interlock marked JR-out, and the coils of the switches M2 and G. The switch J is opened upon the closure of the switch G by reason of the exclusion from its control circuit of the interlock G-out. The motors are thus disposed in parallel relation, as soon as the master controller is moved through the transition position $c$ to its position $d$, with the resistors R1 and R2 in circuit with one motor and the resistors RR1 and RR2 in circuit with the other motor. The closure of the resistor switches R1 to RR2, inclusive, is accomplished by the energization of the conductor 31, and dependent upon the limit switch L1, as hereinbefore described. Furthermore, in position $d$ of the master controller, a new circuit is established from an energized contact member 43, through a control finger 44, conductor 45, interlock marked G-in, the coil of the relay switch 6, and conductors 46 and 28 to the control resistor. The contact member 37 of the relay switch 6 is thus actuated to open the circuit of the actuating coil of the field change-over switch, and this switch cannot be operated until the master controller is moved to its last position e, in which position the contact between the contact member 43 and control finger 44 is broken, thereby allowing the contact member 37 of the relay switch 6 to drop to its lower position to effect the energization of the coil of the field-change-over switch. However, if it should be desired to prevent the operation of the field change-over switch in position e of the controller, as is sometimes desirable in some classes of slow-speed service, it is only necessary to close the switch marked F. C. O. Cutout, whereby the coil of the relay switch 6 is also energized when the controller assumes its position e.

It will thus be observed that the transition from series to parallel relation of the motors is not begun until after the field change-over switch is operated, and until the motor current has decreased to a predetermined value, thereby securing to the control system the full accelerating advantages of the change from "full-field" to "normal field" current.

We do not wish to be restricted to the particular circuit connections or arrangement of parts herein set forth, but desire that only such limitations shall be imposed as are indicated in the appended claims.

We claim as our invention:

1. In a control system, the combination with a supply circuit, a plurality of dynamo-electric machines, means for making certain connections of said machine to said circuit initially in series circuit relation and subsequently in parallel circuit relation, and a limit switch for controlling certain of said connections, of a second limit switch dependent upon predetermined machine current conditions for initiating the transition from series to parallel circuit relation.

2. In a control system, the combination with a main supply circuit, a plurality of electric motors operated therefrom, and switching means comprising a limit switch for connecting said motors initially in series circuit relation and subsequently in parallel circuit relation, of an auxiliary supply circuit, means associated therewith for severally actuating said switching means, and means dependent upon predetermined circuit conditions for energizing certain of said actuating means to effect the transition from series to parallel circuit relation.

3. In a control system, the combination with a main supply circuit, a plurality of electric motors operated therefrom, and switching means for connecting said motors initially in series circuit relation and subsequently in parallel circuit relation, of an auxiliary supply circuit, a plurality of electro-responsive means operatively associated therewith for severally actuating said switching means, an electro-responsive device dependent upon a predetermined value of the main current subsequent to the full series connection of said motors for initiating the transition from series to parallel circuit relation thereof, and means dependent upon said initiation for automatically completing said transition.

4. In a control system, the combination with a main supply circuit, a plurality of electric motors operated therefrom, and a plurality of switches for connecting said motors initially in series circuit relation and subsequently in parallel circuit relation, of an auxiliary control circuit, a plurality of electro-responsive devices operatively connected thereto for severally actuating said switches, an electro-responsive switch dependent upon a predetermined value of the main current subsequent to the full series connection of said motors for completing the control circuit of a certain switch to initiate the transition from series to parallel circuit relation of the motors, and control means dependent upon the actuation of said switch for automatically completing said transition.

5. In a control system, the combination with a supply circuit, an electric motor operated therefrom and provided with an armature winding and a subdivided field winding, switching means for connecting said motor to the supply circuit and for accelerating the same, and a limit switch for governing the acceleration of said motor, of means for normally changing the amount of the motor field winding in circuit under predetermined conditions, and means for preventing said changing under other predetermined conditions.

6. In a control system, the combination with a supply circuit, a plurality of electric motors operated therefrom and severally provided with armature windings and subdivided field windings, and switching means for connecting said motors initially in series circuit relation and subsequently in parallel circuit relation, of means for normally changing the amounts of the motor field windings in circuit, under predetermined conditions, and means for preventing said changing, under other predetermined conditions.

7. In a control system, the combination with a supply circuit, a plurality of electric motors operated therefrom and severally provided with armature windings and subdivided field windings, and switching means for connecting said motors initially in series circuit relation and subsequently in parallel circuit relation, of means for normally decreasing the amounts of the motor field windings in circuit subsequently to the full series and the full parallel connection of the motors, and auxiliary means for rendering said decreasing means inoperative, under predetermined conditions.

8. In a control system, the combination with a supply circuit, a plurality of electric motors operated therefrom and severally provided with armature windings and subdivided field windings, and switching means for connecting said motors initially in series circuit relation and subsequently in parallel circuit relation, of an auxiliary supply circuit, means associated therewith for severally actuating said switching means, means for decreasing the amounts of the motor field windings in circuit, under predetermined conditions, means energized from said auxiliary circuit for actuating said decreasing means, and means for opening the circuit of said last means only.

9. In a control system, the combination with a main supply circuit, a plurality of electric motors operated therefrom, and a plurality of switches for connecting said motors initially in series circuit relation and subsequently in parallel circuit relation, of an auxiliary control circuit, a plurality of electro-responsive devices operatively connected thereto for severally actuating said switches, means for decreasing the amounts of the motor field windings in circuit subsequently to the full series and the full parallel connections of the motors, means energized from said auxiliary circuit for normally actuating said decreasing means, a switch for controlling the circuit of said last means only, and means adapted to be connected to said auxiliary circuit under predetermined conditions for opening said switch to render said decreasing means inoperative when the motors are connected in full parallel relation.

10. In a control system, the combination with a plurality of electric motors and a plurality of governing switches therefor, of means for employing certain of said switches for accelerating said motors to full-series relation, and a limit switch dependent upon motor-current conditions for effecting the closure of certain switches and the opening of others to connect the motors in initial parallel relation.

11. In a control system, the combination with a supply circuit, a plurality of electric motors and a plurality of governing switches therefor, of means comprising a limit switch for employing certain of said switches for accelerating said motors to full-series relation, a second limit switch dependent upon motor-current conditions for closing a direct circuit between said motors, means dependent upon the closure of said circuit for opening certain of the series accelerating switches, and means for thereupon connecting one motor to the positive and the other motor to the negative supply-circuit conductor.

In testimony whereof, we have hereunto subscribed our names this 15th day of Apr., 1914.

ARTHUR J. HALL.
LYNN G. RILEY.

Witnesses:
G. R. IRWIN,
B. B. HINES.

Copies of this patent may be obtained for five cents each, by addressing the "Commissioner of Patents, Washington, D. C."